United States Patent [19]

Engel

[11] Patent Number: 4,529,240

[45] Date of Patent: Jul. 16, 1985

[54] CARRYING DEVICE

[76] Inventor: A. Richard Engel, 7250 Blue Hill Dr., San Jose, Calif. 95129

[21] Appl. No.: 486,782

[22] Filed: Apr. 19, 1983

Related U.S. Application Data

[63] Continuation of Ser. No. 237,435, Feb. 23, 1981, abandoned.

[51] Int. Cl.³ .................. B65D 71/00; F16G 11/14
[52] U.S. Cl. ............................... 294/141; 17/21; 24/129 R; 294/74; 294/150; 294/165
[58] Field of Search ............ 294/31.2, 74, 78 R, 294/79, 141-143, 149-159, 162, 164, 165, 167, 168, 170; 17/21, 44, 44.1, 44.2; 24/115 R, 115 G, 115 H, 115 J, 115 K, 115 M, 128, 129 R, 129 A, 129 D, 130, 136 R, 136 L; 119/153

[56] References Cited

U.S. PATENT DOCUMENTS

| | | | |
|---|---|---|---|
| 904,863 | 11/1908 | Glass et al. ................ | 24/136 R |
| 1,652,351 | 12/1927 | Dyer ........................... | 24/129 R |
| 2,159,223 | 5/1939 | Okun . | |
| 2,297,661 | 9/1942 | Okun . | |
| 2,620,218 | 12/1952 | Morith ....................... | 294/78 R |
| 2,742,865 | 4/1956 | Chandler et al. ........... | 24/129 R X |
| 2,819,923 | 1/1958 | Anderson ................... | 294/150 X |
| 2,983,976 | 5/1961 | Ehmann . | |
| 3,039,159 | 6/1962 | Burke . | |
| 3,188,130 | 6/1965 | Pietrowicz ................. | 294/79 X |
| 3,209,395 | 10/1965 | Jones et al. ................ | 17/21 |
| 3,257,054 | 6/1966 | Miesel ........................ | 294/149 |
| 3,614,098 | 10/1971 | Carr ............................ | 24/115 R X |
| 3,827,790 | 8/1974 | Wenzel ...................... | 24/129 W |
| 3,933,287 | 1/1976 | Foley ......................... | 294/165 X |
| 4,074,916 | 2/1978 | Schindler ................... | 24/115 H |
| 4,245,840 | 1/1981 | Van Housen .............. | 24/115 H X |
| 4,317,257 | 3/1982 | Engel ......................... | 294/74 X |

FOREIGN PATENT DOCUMENTS

| | | | |
|---|---|---|---|
| 249881 | 1/1912 | Fed. Rep. of Germany ......... | 17/21 |
| 1131346 | 10/1968 | United Kingdom ............ | 24/129 R |

*Primary Examiner*—Johnny D. Cherry

[57] ABSTRACT

A cable device having multiple purposes such as the dragging and skinning of animals and the attachment of articles onto a horse saddle. The device employs a novel sleeve device for allowing the quick attachment and release of articles.

1 Claim, 9 Drawing Figures

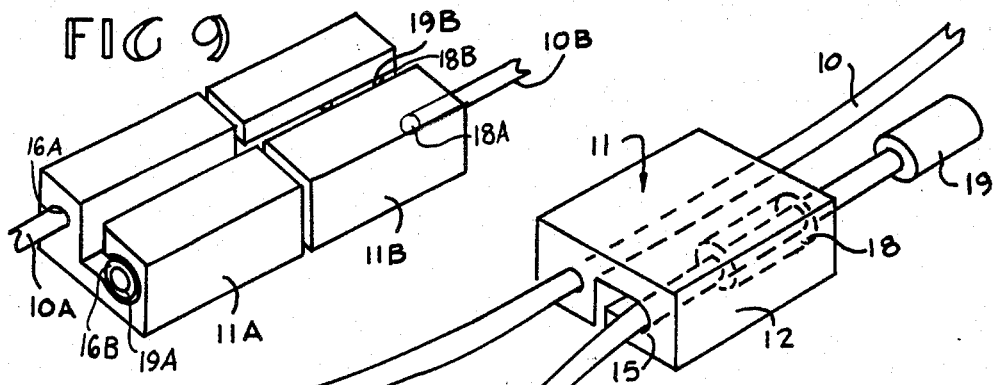
FIG 9
FIG 5
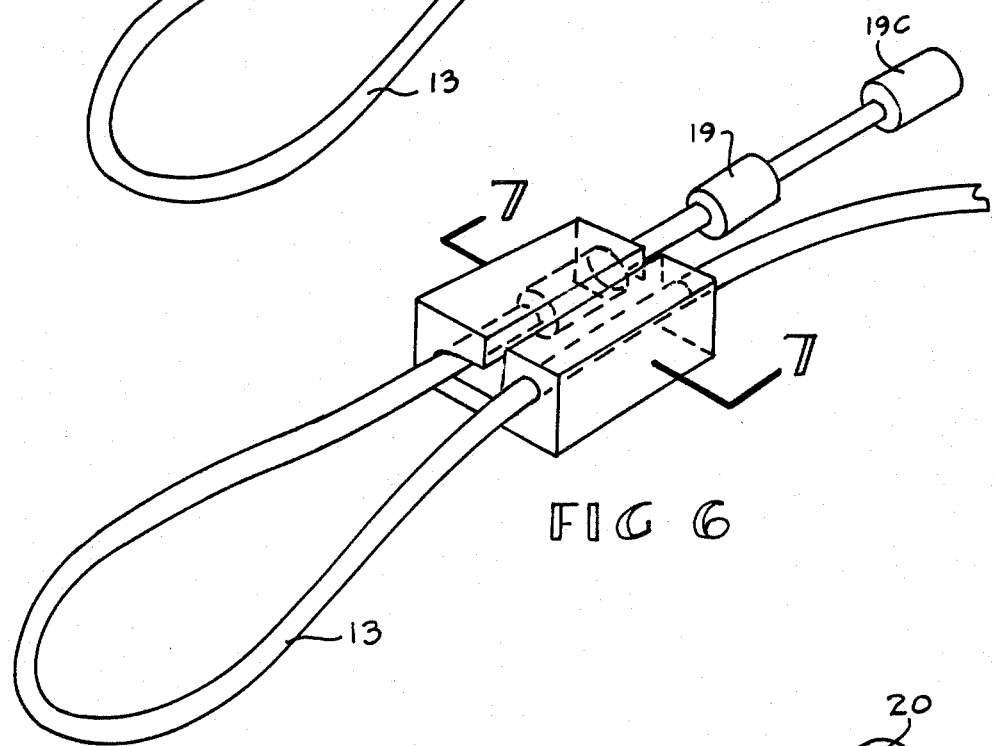
FIG 6
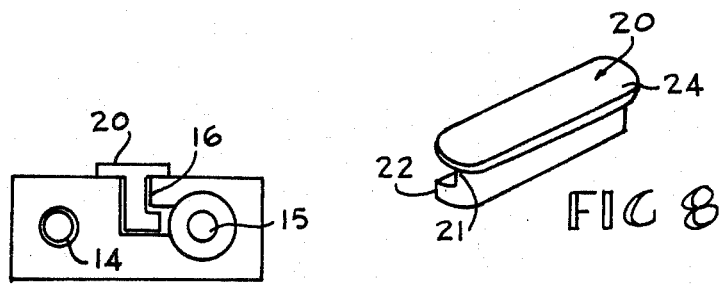
FIG 7
FIG 8

CARRYING DEVICE

This is a continuation of application Ser. No. 237,435, field Feb. 23, 1981, now abandoned.

BACKGROUND OF THE INVENTION

Sportsmen, and especially sportsmen who hunt large animals, encounter the problems of carrying the animal to a place for skinning, skinning the animal and subsequently transporting the carcass to the road because of the weight and the cumbersome shape of the load.

Additionally it is difficult to skin the hide from large animals killed in the woods. The difficulty stems from the size of the animal being handled as well as the necessity for keeping the carcass clean. It is preferable to field dress the carcass as soon as possible and to complete the skinning soon thereafter for the preservation of the meat.

It is the purpose of the present invention to provide a device enabling the transport of an animal carcass from the woods and the skinning of the carcass. Other uses for the device include the hanging of articles from the saddle.

SUMMARY OF THE INVENTION

A pulling device utilizing an elongated cable with a sleeve fixed to each end forming a loop in the cable. Intermediate these sleeves is at least one permanent loop formed in the cable serving as a hand-hold. The device can be looped around the leg of an animal and dragged along by pulling on the hand-hold. An additional loop formed intermediate the sleeves serves as a means for attachment to the skin of an animal such that by pulling on the sleeve ends of the cable, the skin can be stripped from the animal. The hand-holds also allow attachment of the device to the saddle horn for transporting articles on a horse.

DESCRIPTION OF THE DRAWINGS

FIGS. 5 and 6 are views of the cable and sleeve;

FIG. 7 is a cross-sectional view along the line 7—7 of FIG. 6;

FIG. 8 is a perspective view of the keeper; and

FIG. 9 shows two cables joined together by the sleeves.

DESCRIPTION OF THE INVENTION

Figure 1:
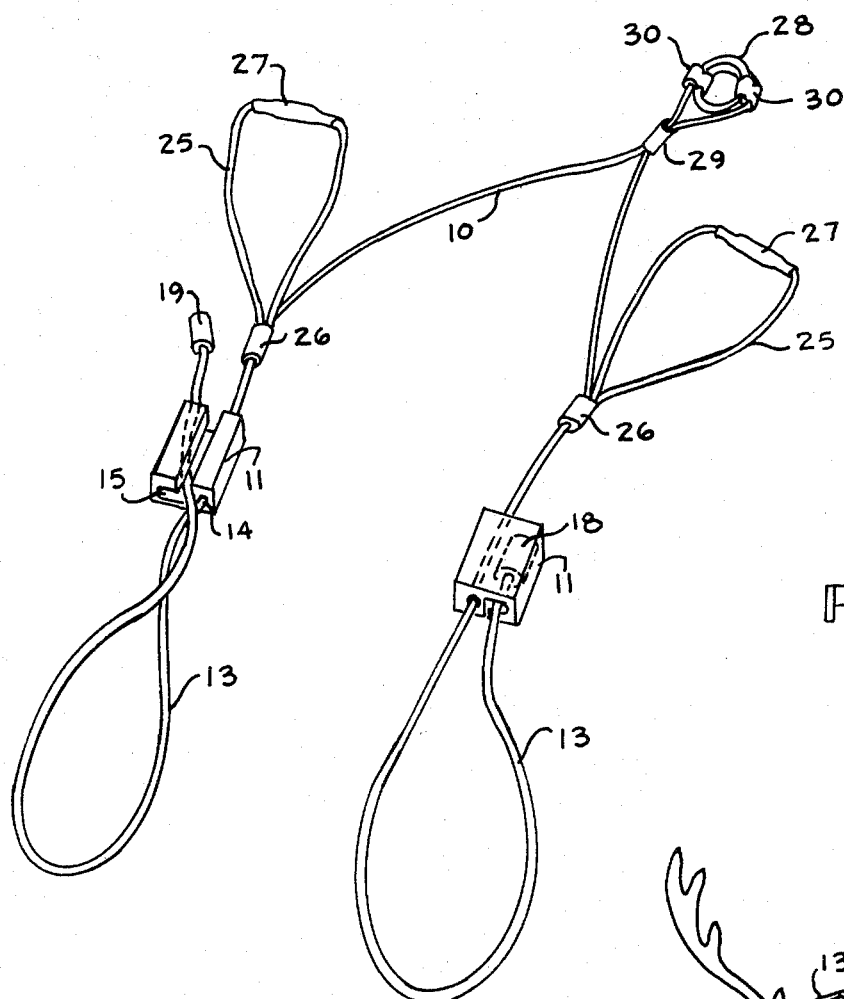
FIG. 1 is a perspective view of the pulling device.

In FIG. 1 is shown a pulling device embodying the present invention. While the device has many uses, it is primarily for use by hunters and outdoorsmen. The device comprises an elongated cable 10 which in the preferred embodiment is preferably a wire rope of at least 1,500 to 2,000 pounds tensile strength. Attached near the ends of the cable are sleeves 11 comprised of a metal block 12 having holes 14 and 15 drilled therethrough along parallel axes. The hole 14 is of sufficient size to slideably receive the wire rope 10. The hole 15 communicates with an L-shaped channel 16 (see FIG. 7) of sufficient size to allow the wire rope to be inserted sideways therein.

One end of the hole 15 is enlarged to form the cylindrical opening 18 for receiving a sleeve or ferrule 19 swaged to the cable end. With this construction of the sleeve the end of the wire rope can be removed from the block, placed around an object and then inserted back through the slot 16 and into the hole 15 with the swaged ferrule 19 fitting within the cylindrical opening 18. In this manner the end of the wire rope is held tightly within the sleeve while the end extending through the hole 14 is formed into a loop and permitted to slide and tighten around any object. As shown in FIG. 6, additional ferrules 19C can be placed around the cable to alter the length of the cable if desired.

To hold the wire cable in the sleeve there is provided a keeper 20 (see FIG. 8) preferably made of a semiresilient material such as plastic or rubber and configured to fit within the L-shaped channel 16. Thus after the wire cable is inserted into the sleeve, this keeper is slid into the channel to maintain the wire cable in position in the manner shown in FIG. 7.

Intermediate the sleeves 11 is a first or hand loop 25 fixed to the wire cable by a swaged tube 26 extended around the cable and the loop ends. Another first loop can also be formed adjacent the other sleeve in the same manner if desired. These loops provide handholds in a manner to be described later. A tube handle 27 can be placed over these loops for providing an easier grip on the wire cable.

Figure 2:
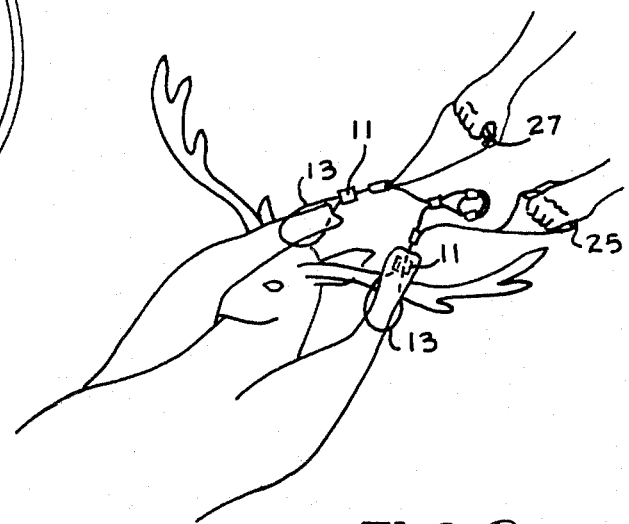
FIG. 2 shows the manner in which the pulling device is utilized to drag a deer carcass.

Intermediate the first loops is formed a second or double loop 28 formed by passing the wire rope through a slide 29 and looping the rope twice and placing therearound a pair of clips 30. This double loop is to permit attachment of the pulling device to objects in a manner to be described. Shown in FIG. 2 is one manner in which the subject pulling device is used. The loops 13 are placed one around each forward leg of an animal carcass such as the deer shown, and if one man is to drag the deer, the hand loops 25 are overlapped and grasped jointly for pulling. If the two men are pulling the deer carcass, each man grabs one of the handles and the carcass is pulled along on its back in the manner shown.

Figure 3:
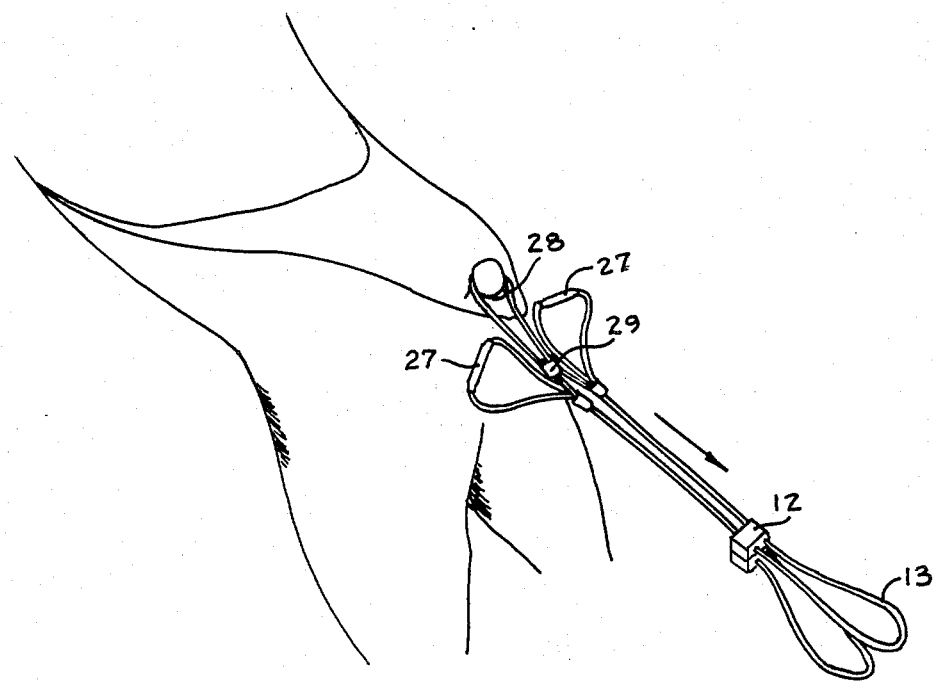
FIG. 3 shows the manner in which the device is used to skin a deer carcass.

In FIG. 3 is shown a second manner in which the subject pulling device is used. When it is desired to skin the carcass, the carcass is hung by the head and the skin of the carcass is cut about the neck and down the stomach. Thereafter by placing the loop 28 around a ball of skin at the back of the neck and pulling the double loop tight with the slide 29 moved towards the ball in the manner shown, a force on the loops 13 pulling downward and away from the carcass will strip the hide from the carcass. Preferably a horse or vehicle is connected to the loops 13 in order to provide sufficient force for skinning. Additionally a rock can be placed within the wad of skin to prevent the loop from slipping.

Figure 4:
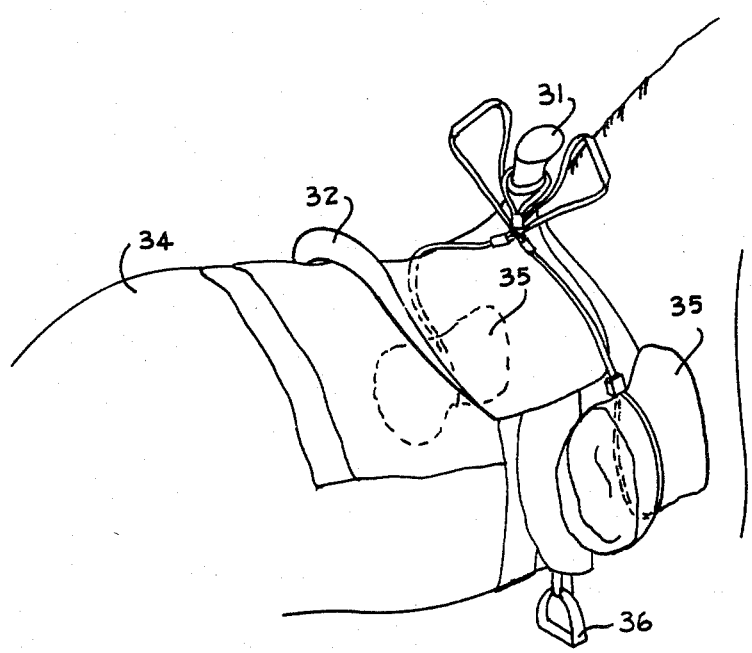
FIG. 4 shows the device attached to a saddle.

In FIG. 4 is illustrated still another use for the subject invention showing that either of the hand loops 25 or the double loop 28 can be connected around the saddle horn 31 of a saddle 32 mounted on a horse 34. In this manner the loops 13 can be tightened around a bag 35 used for carrying articles hanging forward of the stirrups 36 and reasonably out of the way of the rider.

In FIG. 9 is shown still another use for the sleeves. Herein sleeves 11A and 11B are joined by passing the wire cables 10A and 10B through the channels 16A and 16B of the other sleeve and nesting the attached ferrules 19A and 19B in the openings 18A and 18B of the other sleeve. The wire cables are now fixed together to form a continuous cable yet are easily disconnected by removing the ferrules from the sleeves.

Thus it can be seen that there is provided a universal pulling device which can be used in many ways and can be made in variations to suit the needs of the outdoorsman.

The invention claimed:

1. A cable retaining device for forming a cable loop around an article, said device comprising:

a cable having first and second ends;

a ferrule fixed to said first end of said cable;

a sleeve having first and second holes extending therethrough along parallel axes with the second hole being smaller in diameter than said ferrule;

said cable extending through said second hole in sid sleeve with the ferrule preventing the sleeve from separating from the cable by the first end passing through said second hole;

said sleeve first hole being a slot in the side of said sleeve and including a recess offset to the side of the slot hole for holding said ferrule such that the cable can be inserted sidewise into said slot and the ferrule seated in said recess to lock said cable first end in said first hole, whereby said cable can be pulled through the second hole to tighten said cable around the article while said cable first end is held in said sleeve;

wherein said slot in said sleeve has an L-shaped cross-section to hold the cable therein and said slot includes a first leg extending between said sleeve holes and intersecting said first hole with a second connecting leg extending away from said first leg such that the cable must first be moved towards said second hole for removal from said slot thereby to hold the cable in said slot.

* * * * *